(12) United States Patent
Namikawa et al.

(10) Patent No.: US 11,702,128 B2
(45) Date of Patent: Jul. 18, 2023

(54) STEERING DEVICE

(71) Applicants: JTEKT CORPORATION, Osaka (JP); TOYOTA JIDOSHA KABUSHIKI KAISHA, Toyota (JP)

(72) Inventors: Isao Namikawa, Okazaki (JP); Koji Anraku, Okazaki (JP); Yusuke Kakimoto, Okazaki (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 16/821,799

(22) Filed: Mar. 17, 2020

(65) Prior Publication Data

US 2020/0298908 A1    Sep. 24, 2020

(30) Foreign Application Priority Data

Mar. 19, 2019    (JP) ................................. 2019-050784

(51) Int. Cl.
*B62D 6/00* (2006.01)
*B62D 5/04* (2006.01)
*B62D 15/02* (2006.01)

(52) U.S. Cl.
CPC ......... *B62D 5/0463* (2013.01); *B62D 5/0481* (2013.01); *B62D 15/029* (2013.01)

(58) Field of Classification Search
CPC .. B62D 5/0463; B62D 5/0481; B62D 15/029; B62D 5/0496; B62D 6/008; B62D 5/0469; B62D 5/046; B62D 6/00

(Continued)

(56) References Cited

U.S. PATENT DOCUMENTS

2003/0141835 A1* 7/2003 Zheng .................. B62D 5/0463
                                                           318/434
2004/0211618 A1* 10/2004 Ogawa .................. B62D 6/008
                                                           180/402

(Continued)

FOREIGN PATENT DOCUMENTS

CN    1769122 A    5/2006
DE    102 61 001 A1    7/2004

(Continued)

OTHER PUBLICATIONS

Jul. 17, 2020 Extended Search Report issued in European Patent Application No. 20163587.7.

(Continued)

*Primary Examiner* — Shardul D Patel
(74) *Attorney, Agent, or Firm* — Oliff PLC

(57) ABSTRACT

A steering device includes: a mechanism configured to turn turning wheels of a vehicle; a motor configured to generate drive force that is applied to the mechanism; and a controller configured to control the motor in accordance with a steering state. The controller includes a determination circuit configured to determine whether or not one of the turning wheels is in contact with an obstacle based on at least a value of electric current that is supplied to the motor and a vehicle speed. The controller is configured to, when one of the turning wheels is in contact with the obstacle, notify a driver that one of the turning wheels is in contact with the obstacle.

3 Claims, 5 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2005/0082106 A1 | 4/2005 | Husain et al. | |
| 2006/0080016 A1* | 4/2006 | Kasahara | B62D 6/008 701/41 |
| 2006/0214409 A1* | 9/2006 | Tamura | B62D 1/04 280/771 |
| 2011/0036660 A1* | 2/2011 | Kojo | B62D 6/002 180/446 |
| 2012/0290175 A1 | 11/2012 | Hisanaga | |
| 2015/0225014 A1* | 8/2015 | Takeda | G06V 20/588 701/41 |
| 2015/0375780 A1* | 12/2015 | Chai | B62D 6/002 701/41 |
| 2018/0072343 A1* | 3/2018 | Sugita | B62D 15/0265 |
| 2020/0269907 A1* | 8/2020 | Namikawa | B62D 15/025 |

FOREIGN PATENT DOCUMENTS

| | | |
|---|---|---|
| DE | 10 2004 050 486 A1 | 6/2005 |
| DE | 10 2005 049 042 A1 | 4/2006 |
| EP | 1 470 989 A2 | 10/2004 |
| JP | 2003-154950 A | 5/2003 |
| JP | 2005-96725 A | 4/2005 |
| JP | 2006-111099 A | 4/2006 |
| JP | 2011-148408 A | 8/2011 |

OTHER PUBLICATIONS

Apr. 29, 2022 Office Action issued in European Patent Application No. 20 163 587.7.

Dec. 2, 2022 Office Action issued in Chinese Patent Application No. 202010192812.6.

Dec. 6, 2022 Office Action issued in Japanese Patent Application No. 2019-050784.

* cited by examiner

STEERING DEVICE

CROSS-REFERENCE TO RELATED APPLICATION

This application claims priority to Japanese Patent Application No. 2019-050784 filed on Mar. 19, 2019, incorporated herein by reference in its entirety.

BACKGROUND

1. Technical Field

The disclosure relates to a steering device.

2. Description of Related Art

There is what is called a steer-by-wire steering device in which motive power transmission between a steering wheel and turning wheels is separated. The steering device has a reaction force motor and a turning motor. The reaction force motor is a generation source of steering reaction force that is applied to a steering shaft. The turning motor is a generation source of turning force that turns the turning wheels. When a vehicle travels, a controller of the steering device generates steering reaction force through control of electric power supply to the reaction force motor, while turning the turning wheels through control of electric power supply to the turning motor.

In the steering device, there may be situations where it becomes difficult to turn the turning wheels toward a turn-increase side, such as a case where one of the turning wheels is in contact with a curbstone in stationary steering. In such situations, the controller of the steering device tends to perform control such that a turning angle of the turning wheels follows a steering angle of the steering wheel. As a result, excessive current may be supplied to the turning motor, resulting in the turning motor or a drive circuit thereof being overheated.

Accordingly, for example, a controller in Japanese Patent Application Publication No. 2006-111099 (JP 2006-111099 A) determines that one of the turning wheels is in contact with an obstacle, when a predetermined determination condition is established. The determination condition includes continuation of a state where the value of actual current supplied to the turning motor is equal to or more than a current threshold for a prescribed time. When determining that one of the turning wheels is in contact with the obstacle, the controller executes predetermined control in order to restrain overheating of the turning motor and to inform a driver that one of the turning wheels is in contact with the obstacle.

When determining that one of the turning wheels is in contact with an obstacle, the controller changes the amount of current supplied to the turning motor to a value smaller than a normal current amount in accordance with the steering angle. Thus, overheating of the turning motor is restrained. When determining that one of the turning wheels is in contact with the obstacle, the controller controls the reaction force motor to generate steering reaction force corresponding to a deviation between a commanded steering angle and an actual steering angle of the turning wheels. This makes it possible to inform the driver that one of the turning wheels is in contact with the obstacle through change of the steering reaction force.

SUMMARY

It is true that when one of the turning wheels is in contact with an obstacle, the controller in JP 2006-111099 A can restrain overheating of the turning motor, and inform the driver that one of the turning wheels is in contact with the obstacle. However, since the controller in JP 2006-111099 A is configured to inform the driver that one of the turning wheel is in contact with the obstacle through change of the steering reaction force, some influence is exerted upon driving of the vehicle by the driver. Accordingly, it is desired to examine appropriate timing for detecting that one of the turning wheels is in contact with an obstacle, or appropriate timing for informing the driver that one of the turning wheels is in contact with the obstacle.

The present disclosure can detect that one of the turning wheels is in contact with an obstacle in appropriate timing.

An aspect of the present disclosure relates to a steering device. The steering device includes: a mechanism; a motor; and a controller. The mechanism is configured to turn turning wheels of a vehicle. The motor is configured to generate drive force that is applied to the mechanism. The controller is configured to control the motor in accordance with a steering state. The controller includes a determination circuit configured to determine whether or not one of the turning wheels is in contact with an obstacle based on at least a value of electric current that is supplied to the motor and a vehicle speed. The controller is configured to, when one of the turning wheels is in contact with the obstacle, notify a driver that one of the turning wheels is in contact with the obstacle.

When one of the turning wheels is in contact with the obstacle, the turning wheels are unable to perform turning. Since operation of the motor is also restricted, the load of the motor increases, resulting in increase in the current supplied to the motor. Accordingly, the configuration makes it possible to determine whether one of the turning wheel is in contact with an obstacle, based on the value of the current supplied to the motor. The vehicle speed is also adopted as one of the determination conditions for determining whether one of the turning wheels is in contact with the obstacle. Accordingly, it is possible to detect that one of the turning wheels is in contact with the obstacle in appropriate timing corresponding to the vehicle speed. It is also possible to inform the driver that one of the turning wheels is in contact with the obstacle in the appropriate timing corresponding to the vehicle speed.

In the steering device, the determination circuit may use a fact that the vehicle speed is in a low-speed area lower than a vehicle speed threshold as one condition for determining that one of the turning wheels is in contact with the obstacle.

The fact that the vehicle speed is in the low-speed area indicates that the vehicle is in a travel state adequate for determining whether one of the turning wheels is in contact with the obstacle. The fact that the vehicle speed is in the low-speed area indicates that the vehicle is in a travel state adequate for informing the driver that one of the turning wheels is in contact with the obstacle.

In the steering device, the mechanism may include a steering shaft configured to rotate in conjunction with operation of a steering wheel, and a turning shaft configured such that motive power transmission between the turning shaft and the steering wheel is separated. The motor may include a reaction force motor configured to generate steering reaction force based on a first command value calculated in accordance with the steering state, and a turning motor as the motor that generates turning force based on a second command value calculated in accordance with the steering state. The steering reaction force may be torque that is applied to the steering shaft and that is in a direction opposite to a steering direction. The turning force may be torque that is applied to the turning shaft for turning the turning wheel.

In the steering device, the controller may include a restriction axial force calculation circuit configured to, when the determination circuit determines that one of the turning wheels is in contact with the obstacle, calculate restriction axial force as control for notifying the driver that one of the turning wheels is in contact with the obstacle. The restriction axial force may be axial force of the turning shaft to be reflected on the first command value of the reaction force motor so as to virtually restrict operation of the steering wheel.

With the configuration, when one of the turning wheels is in contact with the obstacle, the restriction axial force for virtually restricting the operation of the steering wheel is reflected on the first command value for the reaction force motor. As a consequence, the driver feels hitting sensation as the steering reaction force. Through responsive feeling via the steering wheel, the driver can recognize the situation where one of the turning wheels is in contact with the obstacle. It is also possible to virtually restrict operation of the steering wheel by the driver.

In the steering device, the controller may include an ideal axial force calculation circuit, an estimated axial force calculation circuit, and a distribution calculation circuit. The ideal axial force calculation circuit may be configured to calculate ideal axial force that is ideal axial force of the turning shaft based on a target rotation angle of a rotor that rotates in conjunction with turning operation of the turning wheels. The estimated axial force calculation circuit may be configured to calculate, as estimated axial force, axial force of the turning shaft based on an electric current value of the turning motor that is reflective of a vehicle behavior, a road surface state, or the steering state. The distribution calculation circuit may be configured to calculate mixed axial force as the axial force of the turning shaft to be reflected on the first command value for the reaction force motor by mixing the estimated axial force and the ideal axial force in accordance with the vehicle behavior, the road surface state, or the steering state. The distribution calculation circuit may be configured to, when the determination circuit determines that one of the turning wheels is in contact with the obstacle, switch the axial force of the turning shaft to be reflected on the first command value for the reaction force motor, from the mixed shaft force to the estimated axial force as control for notifying the driver that one of the turning wheels is in contact with the obstacle.

With the configuration, when any one of the turning wheels is not in contact with an obstacle, the mixed shaft force, obtained by mixing the ideal axial force based on the target rotation angle of the rotor and the estimated axial force based on the electric current value of the turning motor in accordance with the vehicle behavior or the like, is reflected on the first command value of the reaction force motor. As a result, the reaction force motor generates drive force corresponding to the mixed shaft force. Contrary to this, when one of the turning wheels is in contact with the obstacle, genuine estimated axial force is reflected on the first command value of the reaction force motor. Since the estimated axial force is reflective of the vehicle behavior, the road surface state, or the steering state, the reaction force motor generates the drive force corresponding to the axial force that acts on the turning shaft when one of the turning wheels comes into contact with an obstacle. Therefore, since the driver feels hitting sensation as the steering reaction force through the steering wheel, the driver can recognize the situation where one of the turning wheels is in contact with the obstacle.

The steering device in the present disclosure can detect that one of the turning wheels is in contact with an obstacle in appropriate timing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A first embodiment in which a steering controller is applied to a steer-by-wire steering device will be described below.

Figure 1:
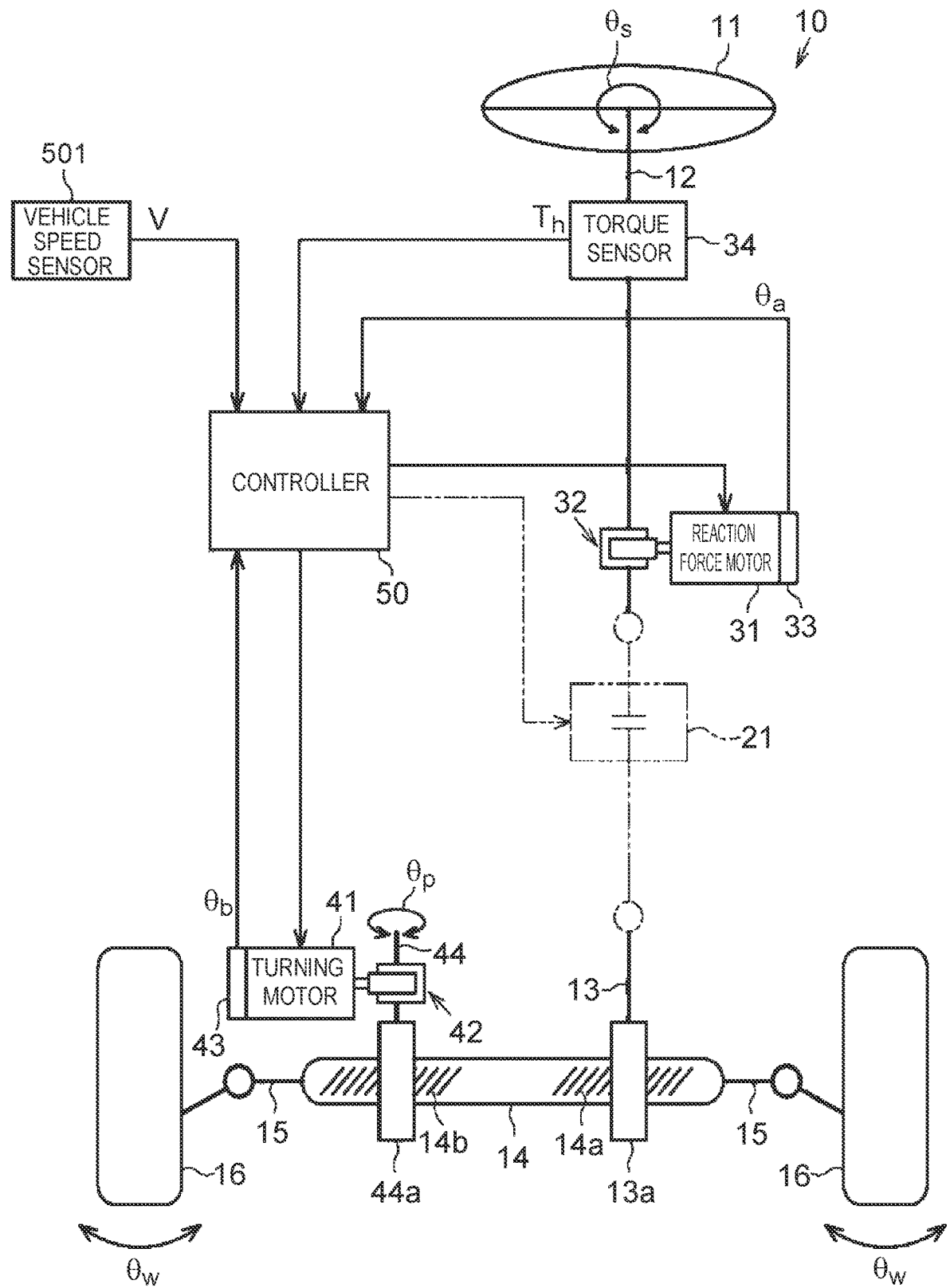
FIG. 1 is a block diagram of a steer-by-wire steering device on which a first embodiment of a steering controller is mounted.

As shown in FIG. 1, the steering device 10 of a vehicle includes a steering shaft 12 coupled with a steering wheel 11. The steering device 10 includes a turning shaft 14 extending along a vehicle width direction (width direction in FIG. 1). The turning shaft 14 has both ends coupled with right and left turning wheels 16 through tie rods 15, respectively. When the turning shaft 14 moves linearly, a turning angle $\theta_s$ of the turning wheels 16 is changed. The steering shaft 12 and the turning shaft 14 constitute a steering mechanism.

The steering device 10 has a reaction force motor 31, a deceleration mechanism 32, a rotational angle sensor 33, and a torque sensor 34 as a configuration for generating steering reaction force. Incidentally, the steering reaction force refers to the force (torque) acting in a direction opposite to a manipulating direction of the steering wheel 11 by a driver. Applying the steering reaction force to the steering wheel 11 can give the driver a moderate responsive feeling.

The reaction force motor 31 is a generation source of the steering reaction force. Adopted as the reaction force motor 31 is a three-phase (U, V, W) brushless motor, for example. The reaction force motor 31 (a rotary shaft thereof to be specific) is coupled with the steering shaft 12 through the deceleration mechanism 32. The torque of the reaction force motor 31 is applied to the steering shaft 12 as steering reaction force.

The rotational angle sensor 33 is provided in the reaction force motor 31. The rotational angle sensor 33 detects a rotation angle $\theta_a$ of the reaction force motor 31. The rotation angle $\theta_a$ of the reaction force motor 31 is used for calculation of a rudder angle (steering angle) $\theta_s$. The reaction force motor 31 and the steering shaft 12 are interlocked through the deceleration mechanism 32. Accordingly, there is a correlation between the rotation angle $\theta_a$ of the reaction force motor 31 and the rotation angle of the steering shaft 12, and by extension, the rudder angle $\theta_s$ that is the rotation angle of the steering wheel 11. Therefore, the rudder angle $\theta_s$ can be calculated based on the rotation angle $\theta_a$ of the reaction force motor 31.

The torque sensor 34 detects a steering torque $T_h$ applied to the steering shaft 12 through the turning operation of the steering wheel 11. The torque sensor 34 is provided in a portion of the steering shaft 12 closer to the side of the steering wheel 11 than the deceleration mechanism 32.

The steering device 10 has a turning motor 41, a deceleration mechanism 42, and a rotational angle sensor 43 as a configuration for generating turning force that is the motive power for turning the turning wheels 16.

The turning motor 41 is a generation source of the turning force. Adopted as the turning motor 41 is a three-phase brushless motor, for example. The turning motor 41 (a rotary shaft thereof to be specific) is coupled with a pinion shaft 44 through the deceleration mechanism 42. The pinion shaft 44 has a pinion gear tooth 44a that gears with a rack tooth 14b of the turning shaft 14. The torque of the turning motor 41 is applied as turning force to the turning shaft 14 through the pinion shaft 44. The turning shaft 14 moves along the vehicle width direction (width direction in the drawing) in accordance with rotation of the turning motor 41.

The rotational angle sensor 43 is provided in the turning motor 41. The rotational angle sensor 43 detects a rotation angle $\theta_b$ of the turning motor 41. Incidentally, the steering device 10 includes a pinion shaft 13. The pinion shaft 13 is provided so as to be orthogonal to the turning shaft 14. The pinion shaft 13 has a pinion gear tooth 13a that gears with a rack tooth 14a of the turning shaft 14. The reason for providing the pinion shaft 13 is to support the turning shaft 14 together with the pinion shaft 44 within a housing (illustration omitted). More specifically, the steering device 10 includes a support mechanism (illustration omitted) that supports the turning shaft 14 so as to be movable along an axial direction while pressing the turning shaft 14 toward the pinion shafts 13, 44. Accordingly, the turning shaft 14 is supported within the housing. However, other support mechanisms without using the pinion shaft 13 may be provided to support the turning shaft 14 within the housing.

The steering device 10 also includes a controller 50. The controller 50 controls the reaction force motor 31 and the turning motor 41 based on detection results of various kinds of sensors. The sensors include a vehicle speed sensor 501 in addition to the rotational angle sensor 33, the torque sensor 34, and the rotational angle sensor 43 mentioned before. The vehicle speed sensor 501 is provided in the vehicle to detect a vehicle speed V that is a travel speed of the vehicle.

The controller 50 executes reaction force control that generates steering reaction force corresponding to the steering torque $T_h$ through drive control of the reaction force motor 31. The controller 50 calculates target steering reaction force based on the steering torque $T_h$ and the vehicle speed V, and calculates a target rudder angle (target steering angle) of the steering wheel 11 based on the calculated target steering reaction force, the steering torque $T_h$, and the vehicle speed V. The controller 50 calculates a rudder angle correction amount through feedback control of the rudder angle $\theta_s$ that is executed such that an actual rudder angle $\theta_s$ follows the target rudder angle. The controller 50 then calculates a steering reaction force command value by adding the calculated rudder angle correction amount to the target steering reaction force. The controller 50 supplies to the reaction force motor 31 a current that is required to generate the steering reaction force corresponding to the steering reaction force command value.

The controller 50 executes turning control for turning the turning wheels 16 in accordance with a steering state through the drive control of the turning motor 41. The controller 50 calculates a pinion angle $\theta_p$ that is an actual rotation angle of the pinion shaft 44 based on the rotation angle $\theta_b$ of the turning motor 41 detected by the rotational angle sensor 43. The pinion angle $\theta_p$ is a value reflecting the turning angle $\theta_s$ of the turning wheels 16. The controller 50 calculates a target pinion angle using the target steering angle mentioned before. The controller 50 then obtains a deviation between the target pinion angle and the actual pinion angle $\theta_p$, and controls electric power supply to the turning motor 41 so as to eliminate the deviation.

Figure 2:
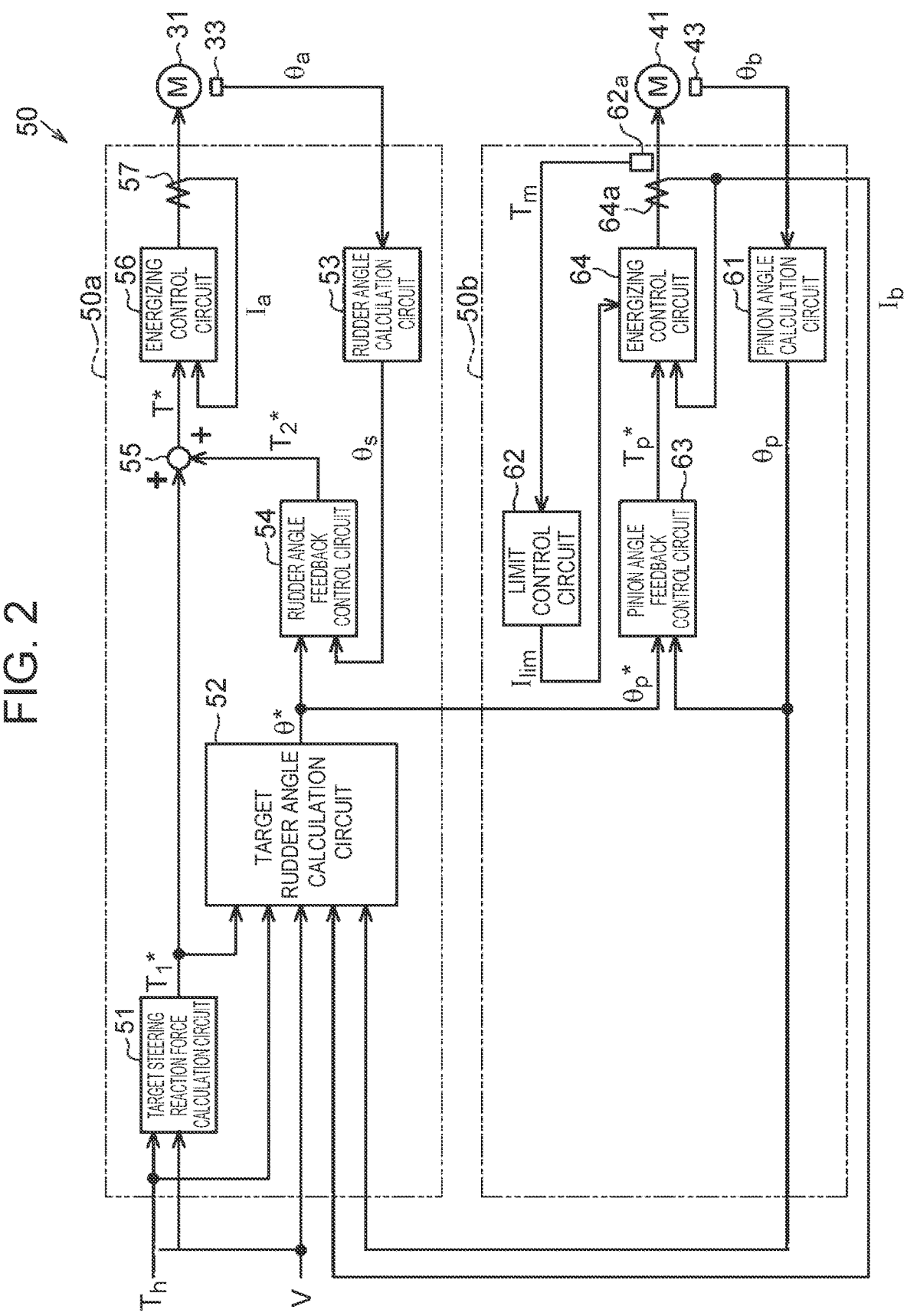
FIG. 2 is a control block diagram of a controller in the first embodiment.

The controller 50 will be described below in detail. As shown in FIG. 2, the controller 50 has a reaction force control circuit 50a that executes reaction force control, and a turning control circuit 50b that executes turning control.

The reaction force control circuit 50a has a target steering reaction force calculation circuit 51, a target rudder angle calculation circuit 52, a rudder angle calculation circuit 53, a rudder angle feedback control circuit 54, an adder 55, and an energizing control circuit 56.

The target steering reaction force calculation circuit 51 calculates a target steering reaction force $T_1^*$ based on the steering torque $T_h$ and the vehicle speed V. The target steering reaction force calculation circuit 51 calculates the target steering reaction force $T_1^*$ that becomes a larger value (absolute value) as an absolute value of the steering torque $T_h$ is larger and the vehicle speed V is lower.

The target rudder angle calculation circuit 52 calculates a target rudder angle $\theta^*$ of the steering wheel 11 using the target steering reaction force $T_1^*$, the steering torque $T_h$, and the vehicle speed V. The target rudder angle calculation circuit 52 has an ideal model for determining an ideal rudder angle (steering angle) based on input torque that is defined as a sum total of the target steering reaction force $T_1^*$ and the steering torque $T_h$. In the ideal model, a rudder angle corresponding to an ideal turning angle in accordance with the input torque is modeled in advance by experiments or the like on the assumption that the steering device has a mechanical coupling between the steering wheel 11 and the turning wheels 16. The target rudder angle calculation circuit 52 obtains the input torque by adding the target steering reaction force $T_1^*$ and steering torque $T_h$, and calculates the target rudder angle $\theta^*$ (target steering angle) from the input torque based on the ideal model.

The rudder angle calculation circuit 53 calculates an actual rudder angle $\theta_s$ of the steering wheel 11 based on the rotation angle $\theta_a$ of the reaction force motor 31 detected by the rotational angle sensor 33. The rudder angle feedback control circuit 54 calculates a rudder angle correction amount $T_2^*$ through feedback control of the rudder angle $\theta_s$ such that the actual rudder angle $\theta_s$ follows the target rudder angle $\theta^*$. The adder 55 adds the rudder angle correction amount $T_2^*$ to the target steering reaction force $T_1^*$ to calculate a steering reaction force command value $T^*$.

The energizing control circuit 56 supplies electric power corresponding to the steering reaction force command value $T^*$ to the reaction force motor 31. Specifically, the energizing control circuit 56 calculates a current command value for the reaction force motor 31 based on the steering reaction force command value $T^*$. The energizing control circuit 56 also detects, by the electric current sensor 57 provided in a power supply path to the reaction force motor 31, an actual electric current value $I_a$ generated in the power supply path. The electric current value $I_a$ is a value of the actual current supplied to the reaction force motor 31. The energizing control circuit 56 then obtains a deviation between the current command value and the actual electric current value $I_a$, and controls the electric power supply to the reaction force motor 31 so as to eliminate the deviation (feedback control of the current $I_a$). Accordingly, the reaction force motor 31 generates torque corresponding to the steering reaction force command value T*. This makes it possible to give the driver a moderate responsive feeling corresponding to the road surface reaction force.

As shown in FIG. 2, the turning control circuit 50b includes a pinion angle calculation circuit 61, a limit control circuit 62, a pinion angle feedback control circuit 63, and an energizing control circuit 64.

The pinion angle calculation circuit 61 calculates a pinion angle $\theta_p$ that is an actual rotation angle of the pinion shaft 44 based on the rotation angle $\theta_b$ of the turning motor 41 detected by the rotational angle sensor 43. As described before, the turning motor 41 and the pinion shaft 44 interlock through the deceleration mechanism 42. Accordingly, there is a correlation between the rotation angle $\theta_b$ of the turning motor 41 and the pinion angle $\theta_p$. With use of the correlation, the pinion angle $\theta_p$ can be obtained from the rotation angle $\theta_b$ of the turning motor 41. Furthermore, as describe before, the pinion shaft 44 gears with the turning shaft 14. Accordingly, there is also a correlation between the pinion angle $\theta_p$ and a movement amount of the turning shaft 14. In short, the pinion angle $\theta_p$ is a value reflective of the turning angle $\theta_w$ of the turning wheels 16.

The limit control circuit 62 calculates a limit value $I_{lim}$ for limiting the current amount supplied to the turning motor 41 in accordance with, for example, a heat generating state of the turning motor 41. The limit value $I_{lim}$ is set as an upper limit of the current amount that is supplied to the turning motor 41 in viewpoint of protecting the turning motor 41 from overheating. The limit control circuit 62 calculates the limit value $I_{lim}$, when a temperature Tm (estimated temperature) of the turning motor 41 that is detected by a temperature sensor 62a provided in the vicinity of the power supply path to the turning motor 41 exceeds a temperature threshold. For example, the limit value $I_{lim}$ is set to a smaller value as the temperature of the turning motor 41 is higher.

The pinion angle feedback control circuit 63 takes in the target rudder angle $\theta^*$ calculated by the target rudder angle calculation circuit 52 as a target pinion angle $\theta_p^*$. The pinion angle feedback control circuit 63 also takes in the actual pinion angle $\theta_p$ calculated by the pinion angle calculation circuit 61. The pinion angle feedback control circuit 63 calculates a pinion angle command value $T_p^*$ through feedback control of the pinion angle $\theta_p$ (PID control) such that the actual pinion angle $\theta_p$ follows the target pinion angle $\theta_p$ (which is equal to the target rudder angle $\theta^*$ here).

The energizing control circuit 64 supplies electric power corresponding to the pinion angle command value $T_p^*$ to the turning motor 41. Specifically, the energizing control circuit 64 calculates a current command value for the turning motor 41 based on the pinion angle command value $T_p^*$. The energizing control circuit 64 also detects, by an electric current sensor 64a provided in a power supply path to the turning motor 41, an actual electric current value $I_b$ generated in the power supply path. The electric current value $I_b$ is a value of the actual current supplied to the turning motor 41. The energizing control circuit 64 then obtains a deviation between the current command value and the actual electric current value $I_b$, and controls the electric power supply to the turning motor 41 so as to eliminate the deviation (feedback control of the current $I_b$). As a result, the turning motor 41 rotates by an angle corresponding to the pinion angle command value $T_p^*$.

When the limit control circuit 62 calculates the limit value $I_{lim}$, the energizing control circuit 64 limits the current amount (torque generated by the turning motor 41) supplied to the turning motor 41 in accordance with the limit value $I_{lim}$. The energizing control circuit 64 compares an absolute value of the current to be supplied to the turning motor 41 with the limit value $I_{lim}$. When the absolute value of the current to be supplied to the turning motor 41 is larger than the limit value $I_{lim}$, the energizing control circuit 64 limits the absolute value of the current to be supplied to the turning motor 41 to the limit value $I_{lim}$. As a consequence, the torque generated by the turning motor 41 is limited to the torque corresponding to the limit value $I_{lim}$. When the absolute value of the current to be supplied to the turning motor 41 is equal to or less than the limit value $I_{lim}$, the energizing control circuit 64 supplies an original current calculated through the feedback control of the electric current value $I_b$ to the turning motor 41 without any change. The torque generated by the turning motor 41 is not limited.

The target rudder angle calculation circuit 52 will be described below in detail. As described before, the target rudder angle calculation circuit 52 calculates the target rudder angle $\theta^*$ based on the input torque that is a sum total of the target steering reaction force $T_1^*$ and the steering torque $T_h$ according to the ideal model. In the ideal model, input torque $T_{in}^*$ that is a torque to be applied to the steering shaft 12 is expressed by following expression (1):

$$T_{in}^* = J\theta^{*''} + C\theta^{*'} + K\theta^* \qquad (1)$$

where "J" is inertial moment of the steering wheel 11 and the steering shaft 12, "C" is a viscosity coefficient (friction coefficient) corresponding to the friction of the turning shaft 14 against the housing, or the like, and "K" is a spring coefficient when the steering wheel 11 and the steering shaft 12 are regarded as springs, respectively.

As indicated by the expression (1), the input torque $T_{in}^*$ is obtained by adding a value of multiplying a second-order time differential value $\theta^{*''}$ of the target rudder angle $\theta^*$ by the inertia moment J, a value of multiplying a first-order time differential value $\theta^{*'}$ of the target rudder angle $\theta^*$ by the viscosity coefficient C, and a value of multiplying the target rudder angle $\theta^*$ by the spring coefficient K. The target rudder angle calculation circuit 52 calculates the target rudder angle $\theta^*$ according to the ideal model based on the expression (1).

Figure 3:
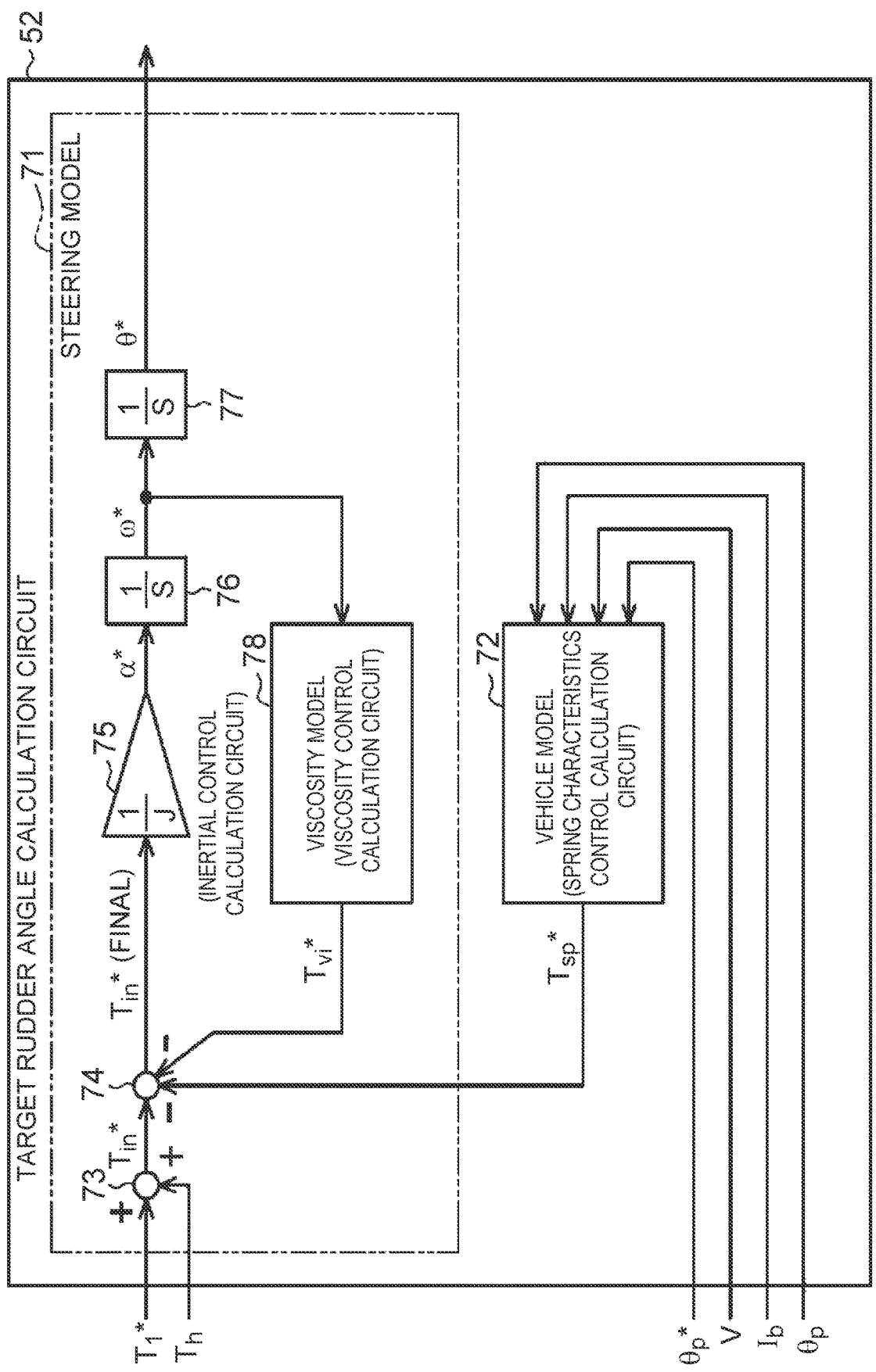
FIG. 3 is a control block diagram of a target rudder angle calculation circuit in the first embodiment.

As shown in FIG. 3, the ideal model based on an expression (1) is divided into a steering model 71 and a vehicle model 72. The steering model 71 is tuned in accordance with the characteristics of the component members of the steering device 10, such as the steering shaft 12 and the reaction force motor 31. The steering model 71 includes an adder 73, a subtractor 74, an inertia model 75, a first integrator 76, a second integrator 77, and a viscosity model 78.

The adder 73 calculates the input torque $T_{in}^*$ by adding the target steering reaction force $T_1^*$ and the steering torque $T_h$. The subtractor 74 calculates a final input torque $T_{in}$ by subtracting each of a viscosity component $T_{vi}^*$ and a spring component $T_{sp}^*$ described later from the input torque $T_{in}^*$ calculated by the adder 73.

The inertia model 75 functions as an inertial control calculation circuit corresponding to an inertia term in the expression (1). The inertia model 75 calculates a rudder angle acceleration α* by multiplying the final input torque $T_{in}$* calculated by the subtractor 74 by an inverse of the inertia moment J.

The first integrator 76 calculates a rudder angle speed ω* by integrating the rudder angle acceleration α* calculated by the inertia model 75. The second integrator 77 calculates the target rudder angle θ* by further integrating the rudder angle speed ω* calculated by the first integrator 76. The target rudder angle θ* is an ideal rotation angle of the steering wheel 11 (steering shaft 12) according to the steering model 71.

The viscosity model 78 functions as a viscosity control calculation circuit corresponding to a viscosity term of the expression (1). The viscosity model 78 calculates a viscosity component $T_{vi}$* of the input torque $T_{in}$* by multiplying the rudder angle speed ω* calculated by the first integrator 76 by the viscosity coefficient C.

The vehicle model 72 is tuned in accordance with the characteristics of the vehicle on which the steering device 10 is mounted. The characteristics of the vehicle side that influences the steering characteristics are determined by such elements as specifications of suspension and wheel alignment, and grip force (frictional force) of the turning wheels 16. The vehicle model 72 functions as a spring characteristics control calculation circuit corresponding to a spring term of the expression (1). The vehicle model 72 calculates the spring component $T_{sp}$* (torque) of the input torque $T_{in}$* by multiplying the target rudder angle θ* calculated by the second integrator 77 by the spring coefficient K.

In the thus-configured target rudder angle calculation circuit 52, the inertia moment J and the viscosity coefficient C of the steering model 71, and the spring coefficient K of the vehicle model 72 are each adjusted. As a result, it becomes possible to directly tune the relationship between the input torque $T_{in}$* and the target rudder angle θ*, and to thereby achieve desired steering characteristics.

Moreover, the target rudder angle θ* calculated based on the input torque $T_{in}$* according to the steering model 71 and the vehicle model 72 is used as a target pinion angle $θ_p$. Feedback-control is performed such that an actual pinion angle $θ_p$ matches the target pinion angle $θ_p$. As described before, there is a correlation between the pinion angle $θ_p$ and the turning angle $θ_w$ of the turning wheels 16. Accordingly, the turning operation of the turning wheels 16 corresponding to the input torque $T_{in}$* is also dependent on the steering model 71 and the vehicle model 72. In short, the steering feeling of the vehicle is dependent on the steering model 71 and the vehicle model 72. Therefore, adjusting the steering model 71 and the vehicle model 72 makes it possible to achieve desired steering feeling.

However, in the thus-configured controller 50, the steering reaction force (responsive feeling obtained through steering) corresponds only to the target rudder angle θ*. In other words, the steering reaction force does not reflect the vehicle behavior or the road surface state (such as slipperiness of the road surface). Accordingly, it is hard for the driver to recognize the vehicle behavior or the road surface state through the steering reaction force. Under these circumstances, in the present embodiment, the vehicle model 72 is configured as shown below in view of solving such issues.

Figure 4:
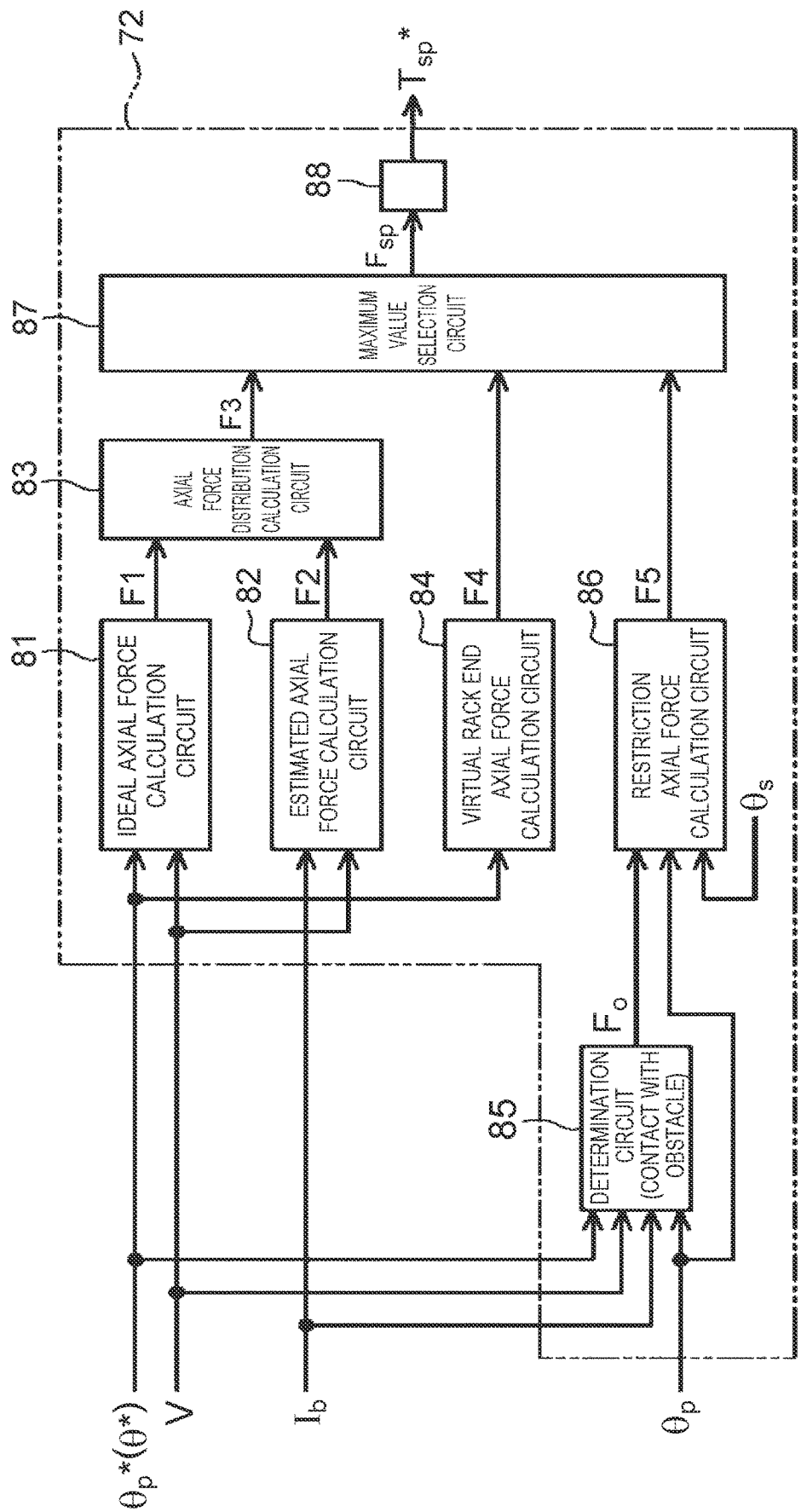
FIG. 4 is a control block diagram of a vehicle model in the first embodiment.

As shown in FIG. 4, the vehicle model 72 includes an ideal axial force calculation circuit 81, an estimated axial force calculation circuit 82, an axial force distribution calculation circuit 83, a virtual rack end axial force calculation circuit 84, a determination circuit 85, a restriction axial force calculation circuit 86, a maximum value selection circuit 87, and a conversion circuit 88.

The ideal axial force calculation circuit 81 calculates an ideal axial force F1 that is an ideal value of the axial force that acts on the turning shaft 14 through the turning wheels 16, based on the target pinion angle $θ_p$. The ideal axial force calculation circuit 81 calculates the ideal axial force F1 using an ideal axial force map stored in a storage device of the controller 50. The ideal axial force map is a map having the target pinion angle $θ_p$* as a horizontal axis and the ideal axial force F1 as a vertical axis. The map defines a relationship between the target pinion angle $θ_p$ and the ideal axial force F1 in accordance with the vehicle speed V. The ideal axial force map has the following characteristics. The ideal axial force F1 is set to have a larger absolute value, as the absolute value of the target pinion angle $θ_p$* becomes larger, and the vehicle speed V becomes lower. As the absolute value of the target pinion angle $θ_p$* becomes larger, the absolute value of the ideal axial force F1 increases linearly. The ideal axial force F1 is set to have the same sign as the sign (positive-negative) of the target pinion angle $θ_p$*.

The estimated axial force calculation circuit 82 calculates an estimated axial force F2 (road surface reaction force) that acts on the turning shaft 14, based on the electric current value $I_b$ of the turning motor 41. Here, the electric current value $I_b$ of the turning motor 41 changes with a difference between the target pinion angle $θ_p$ and an actual pinion angle $θ_p$, the difference being generated when disturbance corresponding to the road surface state (road surface frictional resistance) acts on the turning wheels 16. In short, the electric current value $I_b$ of the turning motor 41 is reflective of the actual road surface reaction force that acts on the turning wheels 16. Accordingly, the axial force reflective of the influence of the road surface state can be calculated based on the electric current value $I_b$ of the turning motor 41. The estimated axial force F2 is obtained by multiplying the electric current value $I_b$ of the turning motor 41 by a gain that is a coefficient corresponding to the vehicle speed V.

The axial force distribution calculation circuit 83 multiplies the ideal axial force F1 and the estimated axial force F2 by distribution ratios (gains) individually set for the ideal axial force F1 and the estimated axial force F2, and sums up the resultant values to obtain a mixed shaft force F3. The distribution ratios are set in accordance with various kinds of state quantities on which the vehicle behavior, the road surface state, or the steering state is reflected. Alternatively, the distribution ratios may be set based only on the vehicle speed V that is one of the state quantities of the vehicle. In that case, as the vehicle speed V is higher, the distribution ratio of the ideal axial force F1 is set to be larger, while the distribution ratio of the estimated axial force F2 is set to be smaller. As the vehicle speed V is lower, the distribution ratio of the ideal axial force F1 is set to be smaller, while the distribution ratio of the estimated axial force F2 is set to be larger.

The virtual rack end axial force calculation circuit 84 calculates, based on the target pinion angle $θ_p$* (target rudder angle θ*) as a virtual rack end angle, a virtual rack end axial force F4 for virtually limiting the operation range of the steering wheel 11. The virtual rack end axial force F4 is calculated based on a viewpoint that when an operative position of the steering wheel 11 approaches a limit position of its operation range, and when the turning shaft 14 approaches a limit position of its physical movable range, the torque (steering reaction force torque) generated by the reaction force motor 31 in a direction opposite to the steering direction is increased rapidly. The limit position of the operation range of the steering wheel 11 is determined by, for example, the length of a spiral cable provided in the steering wheel 11. The limit position of the physical operation range of the turning shaft 14 is a position to which the movement range of the turning shaft 14 is physically restricted due to occurrence of "end-abutting" that is the phenomenon that an end portion (rack end) of the turning shaft 14 abuts an unillustrated housing.

The virtual rack end axial force calculation circuit 84 calculates the virtual rack end axial force F4 with use of a virtual rack end map stored in the storage device of the controller 50. The virtual rack end map is a map having the target pinion angle $\theta_p^*$ as a horizontal axis and the virtual rack end axial force F4 as a vertical axis. The map defines a relationship between the target pinion angle $\theta_p^*$ and the virtual rack end axial force F4. The virtual rack end map has the following characteristics. Until the absolute value of the target pinion angle $\theta_p^*$ reaches an end determination threshold with "0" as a reference, the virtual rack end axial force F4 is maintained at "0" that is a neutral angle corresponding to a steering neutral position or a turning neutral position. Once the absolute value of the target pinion angle $\theta_p^*$ reaches the end determination threshold, the virtual rack end axial force F4 is generated, and the virtual rack end axial force F4 increases rapidly toward the direction where the absolute value increases.

Incidentally, the virtual rack end axial force F4 is set to have the same sign as the sign (positive-negative) of the target pinion angle $\theta_p^*$. The end determination threshold is set based on a proximity value of the rudder angle $\theta_s$ when the steering wheel 11 reaches the limit position of the operation range, or a proximity value of the pinion angle $\theta_p$ when the turning shaft 14 reaches the limit position of the movable range.

The determination circuit 85 determines whether one of the turning wheels 16 is in contact with an obstacle such as a curbstone. The determination circuit 85 determines that one of the turning wheels 16 is in contact with the obstacle such as a curbstone, when all the following four determination conditions A1 to A4 are established:

$$|\Delta\theta_p(=|\theta_p^*-\theta_p|)|>\theta_{th} \quad (A1)$$

$$|I_b|>I_{th} \quad (A2)$$

$$|\omega_p|<\omega_{th} \quad (A3)$$

$$|V|<V_{th} \quad (A4)$$

In the determination condition A1, "$\theta_p^*$" is a target pinion angle, and "$\theta_p$" is an actual pinion angle. In the condition, "$\Delta\theta_p$" is an angle deviation that is obtained by subtracting the actual pinion angle $\theta_p$ from the target pinion angle $\theta_p^*$. Also in the condition, "$\theta_{th}$" is an angle deviation threshold. The angle deviation threshold $\theta_{th}$ is set based on the following viewpoint. When one of the turning wheels 16 is in contact with the obstacle, it is hard to turn the turning wheels 16 toward a turn-increase side. When the steering wheel 11 is steered toward the turn-increase side in the state, the target rudder angle $\theta^*$ and by extension, the target pinion angle $\theta_p^*$ increase in response to the steering, whereas the turning angle $\theta_w$ and by extension, the pinion angle $\theta_p$ are maintained at a constant value. Accordingly, as it is attempted to turn the turning wheels 16 more while one of the turning wheels 16 is in contact with the obstacle, a deviation between the target rudder angle $\theta^*$ and the target pinion angle $\theta_p^*$ increases more. Hence, it can be said that as the absolute value of the angle deviation $\Delta\theta_p$ is larger, the probability that one of the turning wheels 16 is in contact with the obstacle is higher. Therefore, the angle deviation $\Delta\theta_p$ is a value indicating the degree of certainty of the situation where one of the turning wheels 16 is in contact with the obstacle. Based on this viewpoint, an angle deviation threshold $\theta_{th}$ is set by an experiment or simulation in consideration of tolerance caused by noise of the rotational angle sensor 43, or the like.

In the determination condition A2, "$I_b$" is the electric current value $I_b$ of the turning motor 41, and "$I_{th}$" is a current threshold. The electrical current threshold $I_{th}$ is set based on the following viewpoint. As it is attempted to turn the turning wheels 16 more while one of the turning wheels 16 is in contact with the obstacle, the absolute value of the electric current value $I_b$ of the turning motor 41 increases more. Accordingly, it can be said that as the absolute value of the electric current value $I_b$ of the turning motor 41 is larger, the probability that one of the turning wheels 16 is in contact with the obstacle is higher. Therefore, the electric current value $I_b$ of the turning motor 41 is also a value indicating the degree of certainty that one of the turning wheels 16 is in contact with the obstacle. Based on this viewpoint, the current threshold $I_{th}$ is set by an experiment or simulation.

In the determination condition A3, "$\omega_p$" is a pinion angular speed. The pinion angular speed is obtained by differentiating the target pinion angle $\theta_p^*$ or the pinion angle $\theta_p$. In the condition, "$\omega_{th}$" is an angular velocity threshold. The angular velocity threshold $\omega_{th}$ is set based on the following viewpoint. That is, it is difficult to turn the turning wheels 16 while one of the turning wheels is in contact with the obstacle. Accordingly, it can be said that as the turning speed of the turning wheels 16 and by extension, the absolute value of the pinion angular speed $\omega_p$ are smaller, the probability that one of the turning wheels 16 is in contact with the obstacle is higher. Therefore, the pinion angular speed $\omega_p$ is a value indicating the degree of certainty of the situation where one of the turning wheels 16 is in contact with the obstacle. Based on this viewpoint, the angular speed threshold $\omega_{th}$ is set by an experiment or simulation in consideration of tolerance caused by noise of the rotational angle sensor 43, or the like.

In the determination condition A4, "V" is a vehicle speed. In the condition, "$V_{th}$" is a vehicle speed threshold used as a criterion in determining whether the vehicle travels at low speeds. The vehicle speed threshold $V_{th}$ is set based on the vehicle speed V in a low-speed area (0 km/h to less than 40 km/h). For example, the vehicle speed threshold $V_{th}$ is set to "40 km/h." The vehicle speed threshold $V_{th}$ is set based on a viewpoint of determining whether one of the turning wheels 16 is in contact with the obstacle, and by extension, on a viewpoint that whether the travel state of the vehicle is adequate enough to inform the driver that one of the turning wheels 16 is in contact with the obstacle by rapidly changing the steering reaction force as described later.

For example, assume the case where the vehicle travels at a vehicle speed V in a middle-speed area (40 km/h to less than 60 km/h) or a high speed area (60 km/h or more). In such a case, if the driver is informed that one of the turning wheels 16 is in contact with the obstacle, it can be assumed that the driver is not calm enough to timely or successfully perform operation to avoid the obstacle. In view of these circumstances, when the vehicle travels at a vehicle speed V in the middle-speed area or the high speed area, the necessity of informing the driver that one of the turning wheels 16 is in contact with the obstacle is low. In such a case, determining whether one of the turning wheels 16 is in contact with the obstacle itself may lose its significance. Accordingly, in the present embodiment, the state that the vehicle travels at the vehicle speed V in the low vehicle speed area is set as one of the determination conditions for determining whether one of the turning wheels 16 is in contact with the obstacle.

The determination circuit 85 sets the value of a flag Fo in accordance with the determination result regarding whether one of the turning wheels 16 is in contact with the obstacle. The determination circuit 85 sets the value of the flag Fo to "0", when it is determined that one of the turning wheels 16 is not in contact with the obstacle, that is, when at least one condition out of the four determination conditions A1 to A4 is not established. The determination circuit 85 sets the value of the flag Fo to "1", when it is determined that one of the turning wheels 16 is in contact with the obstacle, that is, when all the four determination conditions A1 to A4 are established.

Under the situation where one of the turning wheels 16 is in contact with the obstacle, the restriction axial force calculation circuit 86 calculates a restriction axial force F5 for restricting steering to the side that is in contact with the obstacle. The restriction axial force calculation circuit 86 recognizes the necessity of calculating the restriction axial force F5 based on the determination result of the determination circuit 85, that is, the value of the flag Fo. The restriction axial force calculation circuit 86 does not calculate the restriction axial force F5, when the value of the flag Fo is "0." The restriction axial force calculation circuit 86 calculates the restriction axial force F5, when the value of the flag Fo is "1".

The restriction axial force calculation circuit 86 calculates the restriction axial force F5 based on the rudder angle $\theta_s$ calculated by the rudder angle calculation circuit 53 and the pinion angle $\theta_p$ calculated by the pinion angle calculation circuit 61. When calculating the restriction axial force F5, the restriction axial force calculation circuit 86 calculates a difference (angle deviation) between the rudder angle $\theta_s$ and the pinion angle $\theta_p$ by subtracting the pinion angle $\theta_p$ from the rudder angle $\theta_s$. The restriction axial force calculation circuit 86 then calculates the restriction axial force F5 using a restriction axial force map stored in the storage device of the controller 50. The restriction axial force map is a map having an absolute value of the difference between the rudder angle $\theta_s$ and the pinion angle $\theta_p$ as a horizontal axis and the restriction axial force F5 as a vertical axis. The map defines a relationship between the difference between the rudder angle θs and the pinion angle $\theta_p$ and the restriction axial force F5.

For example, the restriction axial force map has the following characteristics. That is, when the absolute value of the difference between the rudder angle $\theta_s$ and the pinion angle $\theta_p$ is within the range from "0" to a difference threshold, the restriction axial force F5 increases gradually with respect to the increase in the absolute value of the difference between the rudder angle $\theta_s$ and the pinion angle $\theta_p$. Once the absolute value of the difference between the rudder angle $\theta_s$ and the pinion angle $\theta_p$ reaches the difference threshold, the restriction axial force F5 increases rapidly with respect to the increase in the absolute value of the difference between the rudder angle $\theta_s$ and the pinion angle $\theta_p$.

Incidentally, the difference threshold is a value large enough to determine that one of the turning wheels 16 is in contact with the obstacle. The value is set by an experiment or simulation. The restriction axial force F5 is set based on the viewpoint of generating the steering reaction force that is large enough to make it hard for the driver to steer to the side that is in contact with the obstacle after the absolute value of the difference between the rudder angle $\theta_s$ and the pinion angle $\theta_p$ reaches the difference threshold.

The restriction axial force calculation circuit 86 may calculate the restriction axial force F5 in consideration of the electric current value $I_b$ of the turning motor 41 and the pinion angular speed $\omega_p$ in addition to the difference between the rudder angle $\theta_s$ and pinion angle $\theta_p$. More specifically, based on the difference between the rudder angle $\theta_s$ and the pinion angle $\theta_p$, the electric current value $I_b$ of the turning motor 41, and pinion angular speed $\omega_p$, the restriction axial force calculation circuit 86 comprehensively considers the degree of certainty of the situation where one of the turning wheels 16 is in contact with the obstacle, and calculates the restriction axial force F5 in accordance with the degree.

The restriction axial force calculation circuit 86 may calculate the restriction axial force F5 based on a difference between the target rudder angle θ* and the pinion angle $\theta_p$ in place of the difference between the rudder angle $\theta_s$ and the pinion angle $\theta_p$. The difference between the target rudder angle θ* and the pinion angle $\theta_p$ is also a value indicating the degree of certainty of the situation where one of the turning wheels 16 is in contact with the obstacle. The restriction axial force calculation circuit 86 may calculate the restriction axial force F5 based on a difference between the target rudder angle θ* and a turning angle obtained by multiplying the pinion angle $\theta_p$ by a prescribed conversion coefficient, in place of the difference between the rudder angle $\theta_s$ and the pinion angle $\theta_p$.

The maximum value selection circuit 87 takes in the mixed shaft force F3 calculated by the axial force distribution calculation circuit 83, the virtual rack end axial force F4 calculated by the virtual rack end axial force calculation circuit 84, and the restriction axial force F5 calculated by the restriction axial force calculation circuit 86. The maximum value selection circuit 87 selects the axial force largest in absolute value out of the mixed shaft force F3, the virtual rack end axial force F4, and the restriction axial force F5 which are taken in. The maximum value selection circuit 87 sets the axial force selected out of the mixed shaft force F3, the virtual rack end axial force F4, and the restriction axial force F5 as a final axial force $F_{sp}$ used for calculation of the spring component $T_{sp}^*$ with respect to the input torque $T_{in}$.

The conversion circuit 88 calculates (converts) the spring component $T_{sp}^*$ with respect to the input torque $T_{in}^*$ based on the final axial force $F_{sp}$ set by the maximum value selection circuit 87. When the maximum value selection circuit 87 sets the mixed shaft force F3 as the final axial force $F_{sp}$, the spring component $T_{sp}^*$ based on the final axial force $F_{sp}$ is reflected on the input torque $T_{in}^*$. As a result, it becomes possible to apply the steering reaction force corresponding to the vehicle behavior or the road surface state to the steering wheel 11. Since the driver feels the steering reaction force through the steering wheel 11 as responsive feeling, the driver can recognize the vehicle behavior or the road surface state.

When the maximum value selection circuit 87 sets the virtual rack end axial force F4 as the final axial force $F_{sp}$, the spring component $T_{sp}^*$ based on the final axial force $F_{sp}$ is reflected on the input torque $T_{in}^*$, which results in rapid increase in the steering reaction force. This makes it difficult for the driver to operate the steering wheel 11 in the direction where the absolute value of the rudder angle increases. Therefore, since the driver feels hitting sensation as the steering reaction force (responsive feeling), the driver can recognize that the steering wheel 11 reaches the limit position of the virtual operation range.

When the maximum value selection circuit 87 sets the restriction axial force F5 as the final axial force $F_{sp}$, the spring component $T_{sp}*$ based on the final axial force $F_{sp}$ is reflected on the input torque $T_{in}*$, which results in rapid increase in the steering reaction force. This makes it difficult for the driver to operate the steering wheel 11 in the direction of the turning wheel 16 that is in contact with the obstacle. Therefore, since the driver feels hitting sensation as the steering reaction force, the driver can recognize the situation where the turning wheel 16 is in contact with the obstacle, such as a curbstone.

Thus, through control of the reaction force motor 31 and the turning motor 41 by the controller 50, the vehicle behavior, the road surface state, the steering state of the steering wheel 11, or the turning state of the turning wheels 16 can be delivered to the driver through the steering reaction force via the steering wheel 11.

Therefore, the first embodiment can provide the following functions and effects. The controller 50 adopts the vehicle speed V as one of the determination conditions for determining whether one of the turning wheels 16 is in contact with an obstacle, such as a curbstone. Accordingly, it is possible to detect that one of the turning wheels 16 is in contact with the obstacle in appropriate timing corresponding to the vehicle speed V. It is also possible to inform the driver that one of the turning wheels 16 is in contact with the obstacle through the steering reaction force via the steering wheel 11 in appropriate timing corresponding to the vehicle speed V.

The controller 50 informs the driver that one of the turning wheels 16 is in contact with the obstacle through change of the steering reaction force. Accordingly, some influence is exerted upon driving of the vehicle by the driver. For example, since the controller 50 rapidly increases the steering reaction force based on the difference between the rudder angle $\theta_s$ and the pinion angle $\theta_p$, it becomes difficult to operate the steering wheel 11 toward the side that is in contact with the obstacle. Accordingly, depending on the vehicle speed V, there may be some travel states where rapid change in the steering reaction force is not desirable although the rapid change is made for informing the driver that one of the turning wheels 16 is in contact with the obstacle. Examples of such travel states may include the state where the vehicle travels at intermediate speeds or high speeds. Therefore, the vehicle speed V in the low-speed area is suitable as one of the conditions for determining whether one of the turning wheels 16 is in contact with the obstacle. The vehicle speed V in the low-speed area is also the travel state appropriate for informing the driver that one of the turning wheels 16 is in contact with the obstacle by rapidly increasing the steering reaction force.

A second embodiment of the steering controller will be described below. The present embodiment is basically similar in configuration to the first embodiment shown in FIGS. 1 to 3 described before. The present embodiment is different from the first embodiment in that a vehicle model 72 configured without the restriction axial force calculation circuit 86 is adopted.

Figure 5:
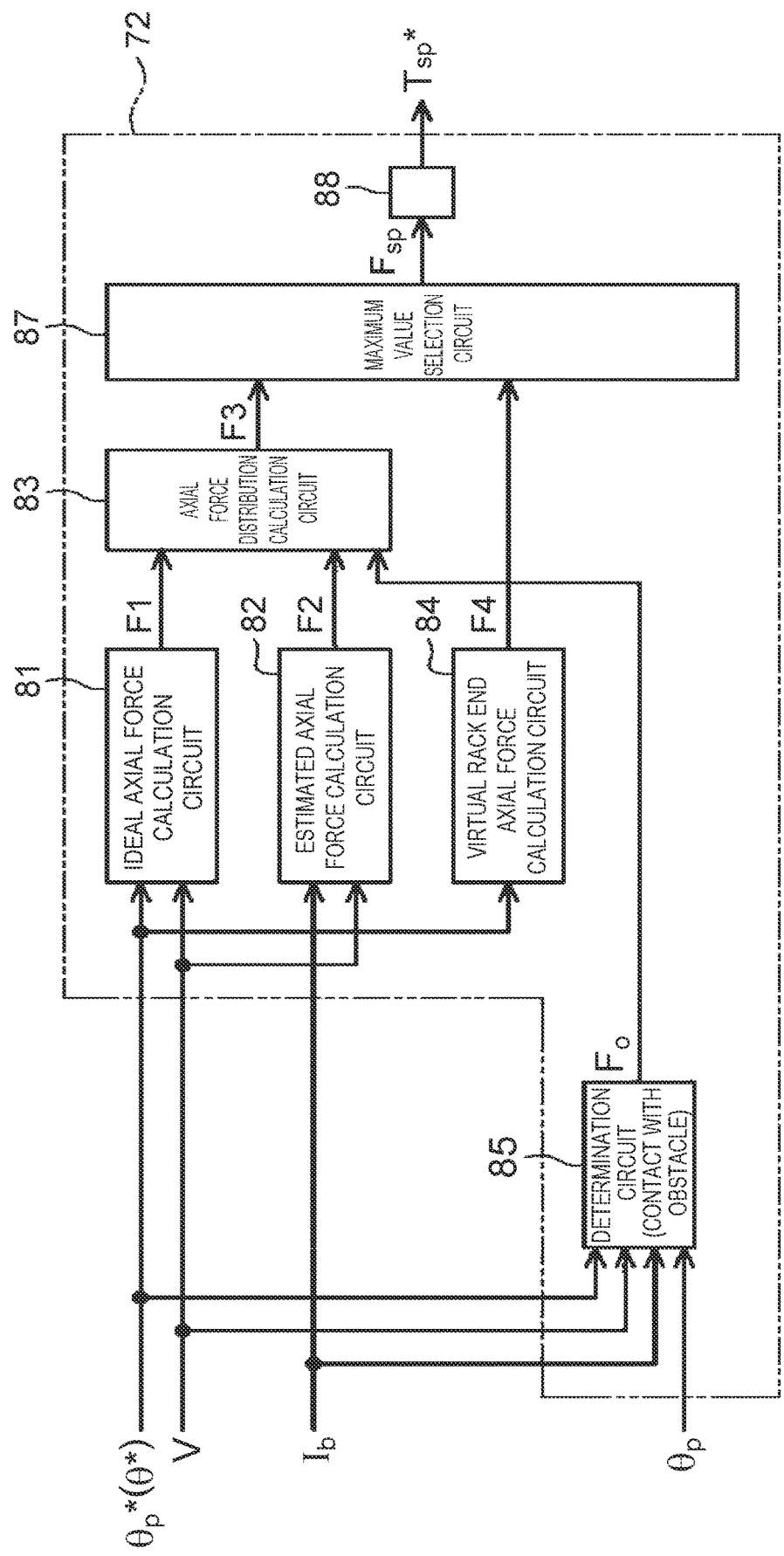
FIG. 5 is a control block diagram of a vehicle model in a second embodiment.

As shown in FIG. 5, the target rudder angle calculation circuit 52 includes an ideal axial force calculation circuit 81, an estimated axial force calculation circuit 82, an axial force distribution calculation circuit 83, a virtual rack end axial force calculation circuit 84, a determination circuit 85, a maximum value selection circuit 87, and a conversion circuit 88. When the determination circuit 85 determines that one of the turning wheels 16 is in contact with an obstacle, that is, when the value of the flag Fo is "1", the axial force distribution calculation circuit 83 supplies the estimated axial force F2, in place of the mixed shaft force F3, to the maximum value selection circuit 87 irrespective of the vehicle behavior, the road surface state, or the steering state.

When one of the turning wheels 16 is in contact with the obstacle, the turning operation of the turning wheels 16 is restricted, and therefore an actual pinion angle $\theta_p$ cannot follow the target pinion angle $\theta_p*$. Accordingly, the electric current value $I_b$ of the turning motor 41 increases rapidly. More specifically, the electric current value $I_b$ of the turning motor 41 and by extension, the estimated axial force F2 calculated based on the electric current value $I_b$ of the turning motor 41 are reflective of the situation where one of the turning wheels 16 is in contact with the obstacle.

Therefore, when the maximum value selection circuit 87 sets the estimated axial force F2 as the final axial force $F_{sp}$, the spring component $T_{sp}*$ based on the final axial force $F_{sp}$ is reflected on the input torque $T_{in}*$, which results in rapid increase in the steering reaction force. Accordingly, since the driver feels hitting sensation as the steering reaction force, the driver can recognize the situation where one of the turning wheels 16 is in contact with the obstacle, such as a curbstone. The second embodiment can provide the same effects as those in the first embodiment.

The first and second embodiments may be carried out with modifications as shown below. In the first embodiment, the virtual rack end axial force F4 and the restriction axial force F5 are each supplied to the maximum value selection circuit 87. However, the following configuration may be adopted instead. In the configuration, the maximum value selection circuit 87 is provided as a first maximum value selection circuit, and a second maximum value selection circuit is provided in a calculation route from the virtual rack end axial force calculation circuit 84 and the restriction axial force calculation circuit 86 to the maximum value selection circuit 87. The second maximum value selection circuit selects an axial force with the largest absolute value out of the virtual rack end axial force F4 and the restriction axial force F5, and sets the selected virtual rack end axial force F4 or restriction axial force F5 as the axial force to be supplied to the first maximum value selection circuit 87.

In the first and second embodiments, the vehicle model 72 may be configured by including an adder in place of the maximum value selection circuit 87. The adder sums up the mixed shaft force F3, the virtual rack end axial force F4, and the restriction axial force F5 to obtain a final axial force $F_{sp}$ used for calculation of spring component $T_{sp}$ with respect to the input torque $T_{in}*$. This configuration can also reflect the mixed shaft force F3, the virtual rack end axial force F4, and the restriction axial force F5 on the steering reaction force.

In the first and second embodiments, the target steering reaction force calculation circuit 51 calculates the target steering reaction force $T_1*$ based on the steering torque $T_h$ and the vehicle speed V. However, the target steering reaction force calculation circuit 51 may calculates the target steering reaction force $T_1*$ only based on the steering torque $T_h$.

In the first and second embodiments, the target rudder angle calculation circuit 52 calculates the target rudder angle $\theta*$ of the steering wheel 11 with use of the input torque $T_{in}*$ that is the sum total of the target steering reaction force $T_1*$ and the steering torque $T_h$. However, the target rudder angle calculation circuit 52 may calculate the target rudder angle θ* of the steering wheel 11 by using only the steering torque $T_h$ or the target steering reaction force $T_1^*$ as the input torque $T_{in}^*$.

In the first and second embodiments, the ideal axial force calculation circuit 81 calculates the ideal axial force F1 based on the target pinion angle $\theta_p^*$ and the vehicle speed V. However, the ideal axial force F1 may be calculated without based on the vehicle speed V. The ideal axial force F1 may be calculated by using a target turning angle that is obtained by multiplying the target pinion angle $\theta_p^*$, in place of the target pinion angle $\theta_p^*$, by the prescribed conversion coefficient.

In the first and second embodiments, the estimated axial force calculation circuit 82 calculates the estimated axial force F2 based on the electric current value $I_b$ of the turning motor 41. However, the estimated axial force calculation circuit 82 may estimate and calculate the axial force that acts on the turning shaft 14 based on, for example, a lateral acceleration or a yaw rate detected through on-vehicle sensors. For example, the estimated axial force can be obtained by multiplying the lateral acceleration by a gain that is a coefficient corresponding to the vehicle speed V. Since the road surface state, such as road surface frictional resistance, or the vehicle behaviors are reflected on the lateral acceleration, the estimated axial force calculated based on the lateral acceleration is reflective of the actual road surface state. The estimated axial force can also be obtained by multiplying a yaw rate differential value, obtained by differentiating the yaw rate, by a vehicle speed gain that is a coefficient corresponding to the vehicle speed V. Since the road surface state such as the road surface frictional resistance, or the vehicle behaviors are also reflected on the yaw rate, the estimated axial force calculated based on the yaw rate is also reflective of the actual road surface state. The estimated axial force calculation circuit 82 may detect the axial force that acts on the turning shaft 14 by the on-vehicle sensors, and may estimate and calculate the axial force that acts on the turning shaft 14 based on the detected axial force. The estimated axial force calculation circuit 82 may detect tire force by the on-vehicle sensors, and may estimate and calculate the axial force that acts on the turning shaft 14 based on the detected tire force.

In the first and second embodiments, the virtual rack end axial force calculation circuit 84 may calculate the virtual rack end axial force F4 using the rudder angle $\theta_s$ and the pinion angle $\theta_p$, in place of the target rudder angle θ* and the target pinion angle $\theta_p$. In this case, the virtual rack end axial force calculation circuit 84 selects an angle with larger absolute value, out of the rudder angle $\theta_s$ and the pinion angle $\theta_p$, and uses the selected angle as a virtual rack end angle $\theta_{end}$ for calculation of the virtual rack end axial force F4.

In the first and second embodiments, the vehicle model 72 configured without the ideal axial force calculation circuit 81 and the axial force distribution calculation circuit 83 may be adopted. In this case, the estimated axial force F2 calculated by the estimated axial force calculation circuit 82 is supplied as it is to the maximum value selection circuit 87.

In the first and second embodiments, the vehicle model 72 configured without virtual rack end axial force calculation circuit 84 may be adopted. In the first and second embodiments, the controller 50 configured without the limit control circuit 62 and the temperature sensor 62a may be adopted.

In the first and second embodiments, the four determination conditions A1 to A4 are set as the determination conditions for determining whether one of the turning wheels 16 is in contact with an obstacle. However, at least two determination conditions A2, A4 may be set.

In the first and second embodiments, the controller 50 calculates the steering reaction force command value T* by adding the rudder angle correction amount $T_2^*$ to the target steering reaction force $T_1^*$. However, the rudder angle correction amount $T_2^*$ may be used as the steering reaction force command value T*. In this case, the controller 50 configured without the adder 55 may be adopted. The target steering reaction force $T_1^*$ calculated by the target steering reaction force calculation circuit 51 is supplied only to the target rudder angle calculation circuit 52. The rudder angle correction amount $T_2^*$ as the steering reaction force command value T* calculated by the rudder angle feedback control circuit 54 is supplied to the energizing control circuit 56.

In the first and second embodiments, a clutch may be provided in the steering device 10. In this case, as shown by a two-dot chain line in FIG. 1, the steering shaft 12 and the pinion shaft 13 are coupled through a clutch 21. Adopted as the clutch 21 is an electromagnetic clutch that connects and disconnects motive power through connection and disconnection of electric power to an exciting coil. The controller 50 executes connection and disconnection control that switches connection and disconnection of the clutch 21. When the clutch 21 is disconnected, the motive power transmission between the steering wheel 11 and the turning wheels 16 is mechanically disconnected. When the clutch 21 is connected, the motive power transmission between the steering wheel 11 and the turning wheels 16 is mechanically connected.

Notification that one of the turning wheels 16 is in contact with an obstacle may be performed as bellows. For notification, the steering device 10 may be provided with a restriction mechanism that mechanically restricts the operation of the steering wheel 11. The restriction mechanism switches between a first state that allows the operation of the steering wheel 11 and a second state that restricts the operation of the steering wheel 11. The controller 50 switches the state of the restriction mechanism from the first state to the second state, when detecting that one of the turning wheels 16 is in contact with an obstacle. When the operation of the steering wheel 11 is restricted, the driver can recognize that one of the turning wheels 16 is in contact with the obstacle.

What is claimed is:

1. A steering device, comprising:
    a mechanism configured to turn turning wheels of a vehicle;
    a motor configured to generate drive force that is applied to the mechanism;
    a first sensor that detects an electric current that is supplied to the motor;
    a second sensor that detects a vehicle speed; and
    a controller configured to control the motor in accordance with a steering state, wherein:
        the controller includes a determination circuit configured to determine whether or not one of the turning wheels is in contact with an obstacle based on at least a value of the electric current that is supplied to the motor being greater than a first predetermined value and a value of the vehicle speed being less than a second predetermined value;
        the controller is configured to, when one of the turning wheels is in contact with the obstacle, notify a driver that one of the turning wheels is in contact with the obstacle;

the mechanism includes a steering shaft configured to rotate in conjunction with operation of a steering wheel, and a turning shaft configured such that motive power transmission between the turning shaft and the steering wheel is separated;

the motor includes
- a reaction force motor configured to generate steering reaction force based on a first command value calculated in accordance with the steering state, and
- a turning motor as the motor that generates turning force based on a second command value calculated in accordance with the steering state, the steering reaction force being torque that is applied to the steering shaft and that is in a direction opposite to a steering direction, the turning force being torque that is applied to the turning shaft for turning the turning wheels; and the controller includes a restriction axial force calculation circuit configured to calculate restriction axial force as control for notifying the driver that one of the turning wheels is in contact with the obstacle, when the determination circuit determines that one of the turning wheels is in contact with the obstacle, the restriction axial force being axial force of the turning shafts to be reflected on the first command value for the reaction force motor so that an operation of the steering wheel is restricted by the reaction force motor that applies the steering reaction force to the steering shaft.

2. The steering device according to claim 1, wherein the determination circuit uses a fact that the vehicle speed is in a low-speed area where the vehicle speed is less than the second predetermined value as one condition for determining that one of the turning wheels is in contact with the obstacle.

3. The steering device according to claim 1, wherein:

the controller includes
- an ideal axial force calculation circuit configured to calculate ideal axial force that is ideal axial force of the turning shaft based on a target rotation angle of a rotor that rotates in conjunction with turning operation of the turning wheels,
- an estimated axial force calculation circuit configured to calculate, as estimated axial force, axial force of the turning shaft based on an electric current value of the turning motor that is reflective of a vehicle behavior, a road surface state, or the steering state, and
- a distribution calculation circuit configured to calculate mixed axial force as the axial force of the turning shaft to be reflected on the first command value for the reaction force motor by mixing the estimated axial force and the ideal axial force in accordance with the vehicle behavior, the road surface state, or the steering state; and the distribution calculation circuit is configured to, when the determination circuit determines that one of the turning wheels is in contact with the obstacle, switch the axial force of the turning shaft to be reflected on the first command value for the reaction force motor from the mixed shaft force to the estimated axial force as control for notifying the driver that one of the turning wheels is in contact with the obstacle.

* * * * *